United States Patent
Pittman et al.

(10) Patent No.: US 7,975,126 B2
(45) Date of Patent: *Jul. 5, 2011

(54) RECONFIGURATION OF EXECUTION PATH UPON VERIFICATION OF EXTENSION SECURITY INFORMATION AND DISABLING UPON CONFIGURATION CHANGE IN INSTRUCTION EXTENSIBLE MICROPROCESSOR

(75) Inventors: Richard Neil Pittman, College Station, TX (US); Alessandro Forin, Bellevue, WA (US); Nathaniel L. Lynch, Richmond, TX (US)

(73) Assignee: Microsoft Corporation, Redmond, WA (US)

( * ) Notice: Subject to any disclaimer, the term of this patent is extended or adjusted under 35 U.S.C. 154(b) by 208 days.

This patent is subject to a terminal disclaimer.

(21) Appl. No.: 12/407,016

(22) Filed: Mar. 19, 2009

(65) Prior Publication Data

US 2009/0177865 A1  Jul. 9, 2009

Related U.S. Application Data

(63) Continuation of application No. 11/646,662, filed on Dec. 28, 2006, now Pat. No. 7,529,909.

(51) Int. Cl.
*G06F 9/30* (2006.01)
(52) U.S. Cl. .................. 712/37; 712/220; 726/27
(58) Field of Classification Search .................. None
See application file for complete search history.

(56) References Cited

U.S. PATENT DOCUMENTS

| | | | |
|---|---|---|---|
| 5,652,887 A | 7/1997 | Dewey et al. | |
| 5,748,979 A * | 5/1998 | Trimberger | 712/37 |
| 6,058,469 A | 5/2000 | Baxter | |
| 7,010,558 B2 | 3/2006 | Morris | |
| 7,036,106 B1 | 4/2006 | Wang et al. | |
| 7,353,363 B2 * | 4/2008 | Chaudhry et al. | 712/209 |
| 2003/0204704 A1 | 10/2003 | Hamlin | |
| 2004/0111590 A1 | 6/2004 | Klein, Jr. | |
| 2004/0250046 A1 | 12/2004 | Gonzalez et al. | |
| 2005/0102492 A1 | 5/2005 | Henry et al. | |
| 2005/0160402 A1 | 7/2005 | Wang et al. | |
| 2005/0223197 A1 * | 10/2005 | Knowles | 712/226 |
| 2005/0273581 A1 | 12/2005 | Arnold et al. | |
| 2005/0289321 A1 | 12/2005 | Hakewill et al. | |

OTHER PUBLICATIONS

Blodget, et al., "A Self-reconfiguring Platform", Date: 2003, pp. 565-574, pp. 565-574, http://www.crhc.uiuc.edu/ede497nc/papers/self_reconf.pdf.

Borgatti, et al., "A reconfigurable system featuring dynamically extensible embedded microprocessor, FPGA, and customizable I/O", Date: Mar. 2003, On pp. 521-529, vol. 38, Issue: 3, http://ieeexplore.iee.org/xpl/freeabs_all.jsp?arnumber=1183864.

(Continued)

*Primary Examiner* — Kenneth S Kim

(57) ABSTRACT

Described is microprocessor architecture that includes at least one reconfigurable execution path (e.g., implemented via FPGAs or CPLDs). When an instruction is fetched, a mechanism determines whether the reconfigurable execution path (and/or which path) will handle that instruction. A content addressable memory may be used to determine the execution path when fed the instruction's operational code, or an arbiter and multiplexer may resolve conflicts if multiple instruction decode blocks recognize the same instruction. The execution path may be dynamically reconfigured, activated or deactivated as needed, such as to extend an instruction set, to optimize instructions for a particular application program, to implement a peripheral device, to provide parallel computing, and/or based on power consumption and/or processing power needs. Security may be provided by having the reconfigurable execution path loaded from an extension file that is associated with metadata, including security information.

20 Claims, 5 Drawing Sheets

OTHER PUBLICATIONS

Brian Box, "Field programmable gate array based reconfigurable preprocessor", Aerospace and Electronics Conference, 1994. NAECON 1994., Proceedings of the IEEE 1994 National, Date: May 23-37, 1994, on pp. 427-434, vol. 1, http://ieeexplore.ieee.org/xpls/abs_all.jsp?arnumber=332979.

Non-Final Rejection, U.S. Appl. No. 11/646,662, mailed Aug. 27, 2008, 6 pages.
Amendment to Non-Final Rejection, Application No. 11/646,662, mailed Nov. 11, 2008, 14 pages.
Notice of Allowance and Fees Due (PTOL-85), U.S. Appl. No. 11/646,662, mailed Dec. 24, 2008, 5 pages.

* cited by examiner

RECONFIGURATION OF EXECUTION PATH UPON VERIFICATION OF EXTENSION SECURITY INFORMATION AND DISABLING UPON CONFIGURATION CHANGE IN INSTRUCTION EXTENSIBLE MICROPROCESSOR

CROSS-REFERENCE TO RELATED APPLICATIONS

This application claims priority to and is a continuation of co-pending U.S. patent application Ser. No. 11/646,662 entitled "Extensible Microcomputer Architecture" and filed Dec. 28, 2006, which is incorporated herein by reference.

BACKGROUND

Conventional microprocessors implement a well-documented, fixed set of instructions. Such microprocessors are realized in fixed logic, and in such a way that it is impossible to add new instructions once the chip has been fabricated. As a result, the instruction set that a given microprocessor can implement is chosen to capture the largest possible set of application requirements, in the most compact form possible.

However, it is presently not possible to create an "optimal" instruction set for a microprocessor that is used for general purpose applications, because the number and variety of available application programs are constantly growing and evolving, and even their main focus shifts as each customer's lifestyle changes. For example, the "x86" instruction set has been evolving regularly over the years; at different stages, new instructions have been added to better deal with scientific computations, to facilitate media and signal processing functionality, and to deal with larger memories and data sets.

At the same time, classical microprocessor architectures have reached their limits in terms of clock speeds. Thus, it is becoming apparent in the industry that a way to provide improvements in execution speed that are expected by application programmers and customers alike require a new way to structure the execution of programs.

In sum, conventional microprocessors and classical microprocessor architectures will no longer be adequate for upcoming computing and data processing requirements.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a microprocessor architecture that includes a trusted instruction set execution path and a reconfigurable execution path, e.g., corresponding to an extension. When an instruction is fetched, a mechanism determines whether the reconfigurable execution path will handle that instruction. For example, the mechanism may be a content addressable memory-based mechanism that outputs data corresponding to an execution path row to use when fed the instruction's operational code, by a priority-based mechanism (e.g., an arbiter and multiplexer) that resolves conflicts if multiple instruction decode blocks recognize and claim the same instruction, or by any other differentiation means, such as a scheduler that handles parallel instruction handling The reconfigurable execution path may be dynamically reconfigured, activated or deactivated based upon one or more various criteria, such as power consumption, processing power, a need for handling a certain (e.g., extended) instruction set, a changed computing task, parallel instruction handling, a changed peripheral configuration, or an application program that is executable in the system.

Security may be facilitated by having the reconfigurable execution path loaded from an extension (e.g., a bitfile) that is associated with metadata including security information. The extension is used to reconfigure reconfigurable electronic components, such as field programmable gate arrays. One or more configurable execution paths can be configured to be operational at the same time, such as to optimize instruction handling for an application program, to implement a peripheral device, to provide parallel computing, and so forth. Power consumption and/or the need for additional processing power can be factors in configuring, enabling and/or disabling each execution path.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a microprocessor architecture including a reconfigurable microprocessor (central processing unit) that combines the advantages of fixed logic (e.g., including reduced size and higher clock rate) with the ability to add to the microprocessor's base instruction set. In one aspect, the architecture allows the microprocessor to be reconfigured to synthesize a multiprocessor system, with each "processor" of the multiprocessor system having an instruction set optimized for a specific task. In other aspects, the microprocessor can be reconfigured such that one or more of the instruction sets are the same as another, to provide for parallel execution of instructions.

In one alternative, a reconfigurable microprocessor may be accomplished by implementing a microprocessor based on field-programmable gate arrays, (or similar circuitry that can be dynamically reconfigured, such as complex programmable logic devices, or CPLDs, in a manner that allows for later extensions and modifications. Another alternative is to implement a microprocessor having fixed logic, but with the logic configured in a dynamically changeable way to interconnect the internal components of the microprocessor. In general, such a class of processors is referred to herein as "dynamically extensible processors" or "reconfigurable" processors.

To this end, an example architecture as described below supports dynamic extensibility, in which at least one desired extension may be enabled, including while the processor continues to execute instructions. At the same time, as will be readily appreciated, the design of the architecture provides safety, whereby the significant flexibility and performance provided by the architecture do not compromise security and/or expose the processor's host computing environment to malicious attacks.

However, although the description herein is directed towards an example architecture that is suitable for realizing dynamically extensible microprocessors and microcomputers, it is understood that this is only one example architecture. For example, other architectures may have more processing stages than those (five stages) illustrated, yet the underlying extensible microcomputer architecture concepts described herein remain valid in such alternatives. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and data processing in general.

Figure 1:
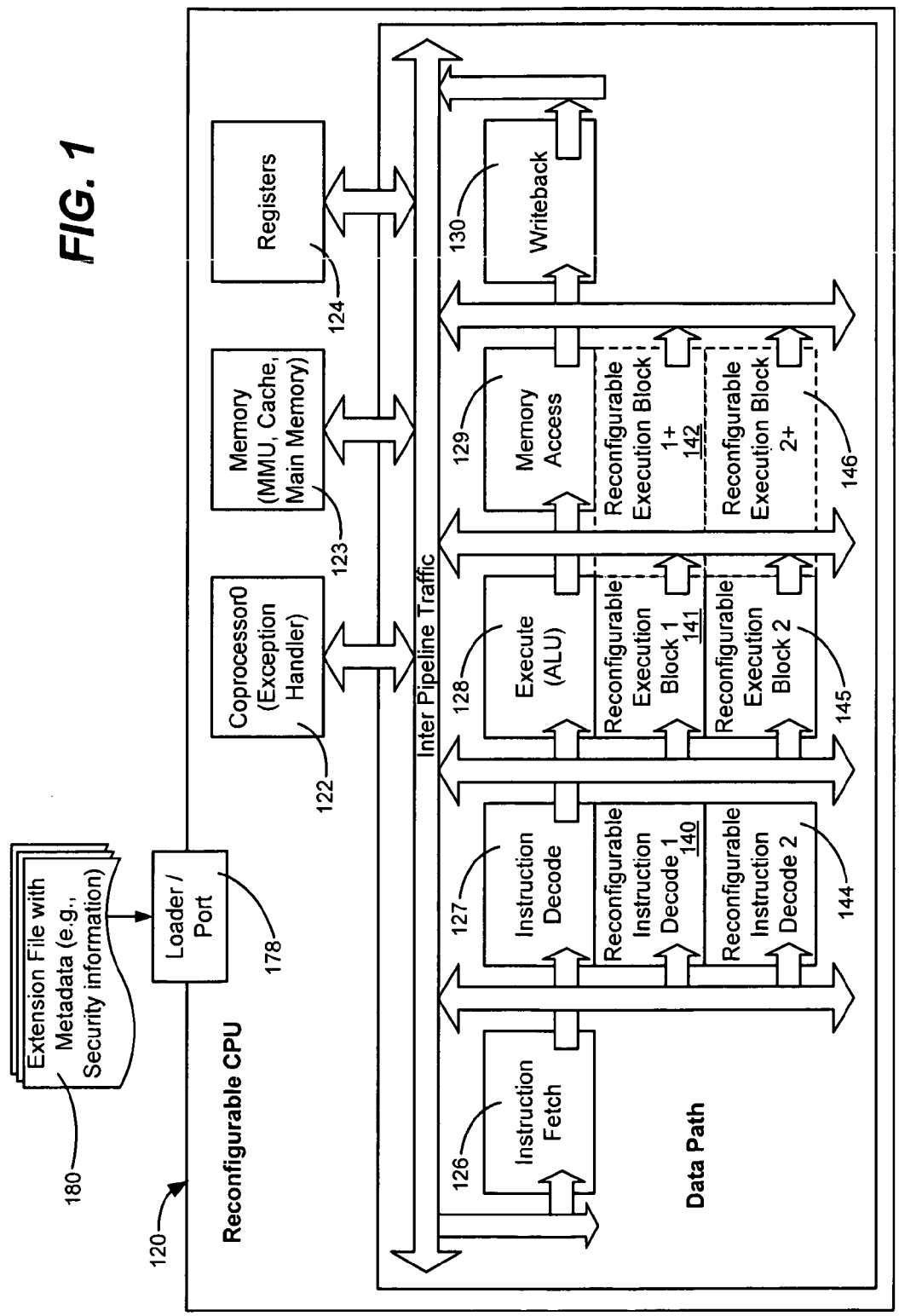
FIG. 1 shows an illustrative example block diagram of a microprocessor architecture including a dynamically reconfigurable central processing unit.

Turning to FIG. 1, there is shown an example architecture including a dynamically extensible processor configuration, which among its benefits provides re-configurability, safety, and significantly improved execution speedup. To this end, as described below, the architecture includes a reconfigurable central processing unit (RCPU) 120 that is capable of extending its own instruction set architecture (ISA) at execution time, in a safe manner. Note that a number of modules that may be present in a high-performance microprocessor are omitted from FIG. 1 for the sake of simplicity; such omitted modules may include branch target caches and prefetching units, instructions decoding queues, speculated execution units, reservation stations, write buffers and so forth.

The reconfigurable central processing unit 120 includes a trusted instruction set architecture (TISA), corresponding to the top two rows of components (the blocks labeled 178, 122-124 and 126-130), comprising the portion of the architecture that is required for the initial operation of the reconfigurable central processing unit 120 and that provides the necessary level of trust and isolation for system software. These components 178, 122-124 and 126-130 are present at power up, and are (typically) neither removed nor disabled. As can be seen, the trusted instruction set architecture portion of the architecture includes the resources that are security-sensitive and the instructions that make use of them, such as the memory management Unit (MMU) in block 123 and other system control registers in block 124.

In general, as with conventional processor architectures, the reconfigurable processor 120 includes pipelined stages for instruction fetch 126, instruction decode 127, instruction execution 128, memory access 129 and writeback of the results to the register file 124. Note that while these components 126-130 are functionally similar to those in a classical CPU architecture, their implementation and interconnection differ in a number of ways, as described below. For example, these components 126-130 provide a mechanism for implementing self-extensions, such as the resources and instructions needed to load and control the other components (represented in the bottom rows, corresponding to blocks 140-142 and 144-146) in FIG. 1. As will be understood, the trusted instruction set components may provide a full-featured microprocessor capable of handling a full instruction set, or alternatively may provide some lesser processing functionality, such as primarily to load the reconfigurable components that handle the bulk of instruction processing.

Turning to the concept of extensions that alter the reconfigurable CPU 120, as represented in FIG. 1, a third row of blocks 140-142 comprises a dynamically reconfigurable extension to the core reconfigurable CPU 120. For example, field programmable gate arrays (FPGAs) may be reconfigured to efficiently process the instructions that an application most frequently needs executed, and/or to provide a means for some parallel execution. Note that another extension row is also depicted in the fourth row of blocks 144-146, such as to efficiently execute the instructions of another running program, or to provide even further parallel execution. Although two such extensions are represented in FIG. 1, it is understood that any number may be present in a given configuration, from one to any practical number, depending on space and other limitations of the physical chip.

Any suitable interface may be used for coupling the extension to the TISA portion; one example is set forth below. An operating system or other mechanism may control the configuration of the extensions. Depending on how open the system is, a program, the user and so forth may reconfigure the reconfigurable CPU 120 on demand or as otherwise needed, e.g., to meet the requirements of a given computing task or tasks.

With respect to an extension for more efficient instruction processing and/or parallel execution, in general, it is readily appreciated that while a CPU designer strives for generality, it is well known that virtually every application program spends most of its time in a very small portion of the code that comprises its executable file image. This is true of general programs for personal computer use, of programs for embedded computers and even for gaming platforms; (analysis shows that the top two or three basic blocks in the executable file image generally account for well over eighty percent of the total execution count). Profiling techniques can be used to determine which instructions to handle in an extension (described below) for more optimal, accelerated execution, e.g., with less clock cycles.

As a result, more efficient execution of a program may be achieved by providing reconfigurable extensions that are loaded on demand as needed to match a given program's requirements. For example, efficiency may be improved by optimizing a set of reconfigurable components with specialized "application-specific instructions," e.g., having the same semantic of the original sequence of general purpose instructions, but with a much more efficient implementation. Speedups are thus achievable, e.g., ranging from a factor of two to a factor of six, and in some cases even larger, although a factor of three is a reasonably conservative estimate of an expected speed-up.

In addition to application-specific instructions, another example of a mechanism that may be realized as an extension is a floating point unit. Such an extension is similar to a floating point unit that may be present in a conventional architecture, except that unlike a conventional floating point unit, an extension is not permanently present (and is typically not present at power up). Rather, extensions are loaded and unloaded dynamically during execution by the trusted instruction set architecture. Other examples of extensions include digital signal processors, encryption processors, and vector processors. It should be understood that instruction execution is not the only profitable use of extensions. Alternative examples include their use with peripherals, such as communication devices. For example, the external pins of the reconfigurable CPU 120 may be connected to external devices such as memories, serial lines and/or other peripherals. Such pins may be controlled by an extension, e.g., which is loaded on demand only when such communication is deemed necessary by system software. When such peripherals are not loaded, the system may save power, or devote the reconfigurable area to other tasks.

With respect to parallel execution, one current trend in the quest for additional execution speed is to provide more than one processing core in the CPU, and to parallelize the execution of as much of the software as possible. As programming and software design techniques for multi-core systems evolve, the reconfigurable CPU 120 will realize even greater speedups by providing multiple customized processors that execute in parallel the instruction blocks for which they are best suited.

As represented in FIG. 1, the blocks of an extension (e.g., 140-142) overlap with the instruction execution component 128 as well as with the instruction decode component 127 and memory access component 129. As described below with reference to FIGS. 2 and 3, an extension overlaps with the instruction decode phase in the component 127 to recognize its own instructions. An extension may or may not need to perform memory accesses; therefore extensions are allowed to overlap with the memory access phase in the component 129 as well.

One example way to implement a reconfigurable CPU on a field programmable gate array is to use "Partial Reconfiguration" to achieve the loading of the extensions, e.g., as described in Xilinx, Inc. "*Two Flows for Partial Reconfiguration: Module Based or Difference Based,*" Application Note XAPP290, Version 1.1, http://www.xilinx.com/xapp/xapp290.pdf, November, 2003. The trusted instruction set architecture is realized as the static portion of the design, a core service that wraps and controls access to the resources of the chip. In this example, a Bus Macro is defined to allow extensions to connect to the trusted instruction set architecture services. Further, the trusted instruction set architecture may be loaded at power up as the initial configuration bitfile by an external agent, such as the Xilinx SystemACE module, e.g., using a loader such as an on-chip configuration port 178 to access and modify the configuration memory plane.

The loader/configuration port 178 is a security-sensitive resource that is protected by the trusted instruction set architecture and correspondingly by the Bus Macro. System software considers the configuration port a supervisor-level resource. In an example implementation, the configuration port may be controlled by a specialized processor that verifies a security signature as well as the trusted instruction set architecture bitfile integrity before performing any configuration operation. This prevents an attacker from tampering with the trusted instruction set architecture bitfile, or with any other extension.

Alternatively, the trusted instruction set architecture may be realized as a fixed logic portion of an application-specific integrated circuit (ASIC) chip, and the extension area as a field programmable gate array in the same package. In this way, such a design removes the known performance gap between field programmable gate arrays and ASICs for the trusted instruction set architecture, while maintaining the flexibility of the reconfigurable extensions in the field programmable gate arrays. Note that this implementation of the architecture differs from current field programmable gate arrays with integrated hard core processors because the individual pipeline stage's input and outputs are accessible from the field programmable gate array, not just the bus interface. Similar considerations apply to other coprocessor style uses of the field programmable gate array fabric.

The physical realization of an extension may be in the form of an augmented bitfile, e.g., 180. This may include the data generated by the manufacturer's tools for reconfiguration of the relevant portion of the chip, (e.g. the regular FPGA configuration bitfile), augmented by metadata including security and management related information. For example, such information may include a security digest to prevent tampering, a certificate of the authority attesting the security properties of the extension, and geometry information for the extension, such as for which extension slot it was compiled, whether multiple implementations are provided (such as one each per available slot), and file offset and size of each implementation. Other information may provide identification of the Bus Macro for which this corresponding extension was compiled, whether the extension can be relocated, and if so, any data necessary to perform the relocation process, and the operational codes (opcodes) that are desired for handling by this particular extension. The secure loader 178, which may include internal and/or external security verification logic, along with other TISA and system software components, may evaluate the security and management information as part of the loading process.

Figure 2:
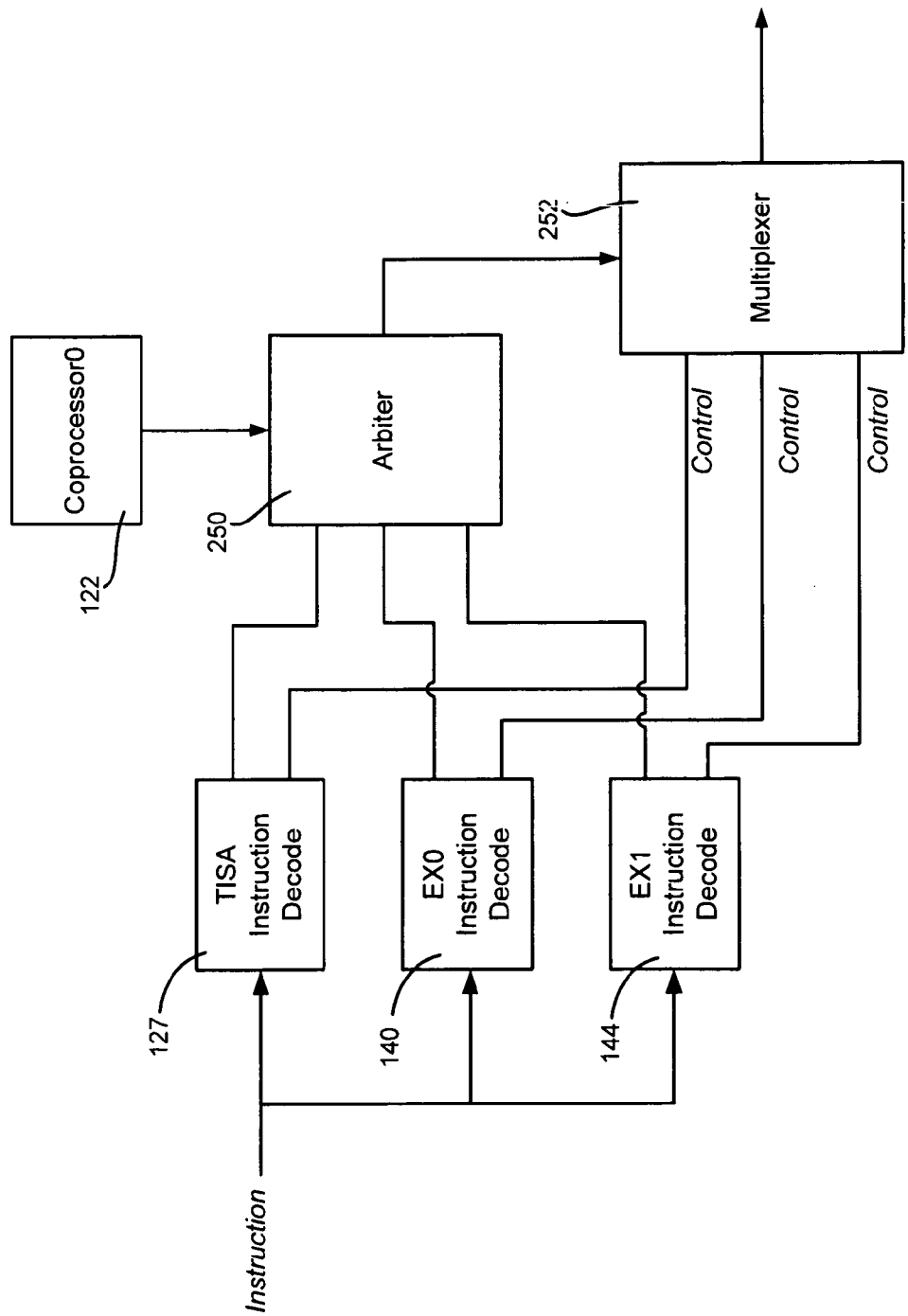
FIG. 2 is a block diagram generally representing an example of how an instruction may be decoded for handling by one of a plurality of execution paths, including a reconfigurable execution path.

FIG. 2 illustrates a general concept of an instruction decode phase, in which an instruction is received by each of the instruction decode blocks 127, 140 and 144; (again, two extensions are shown in FIG. 2, but there may be any practical number). In general, each instruction decode block 127, 140 and 144 decodes each instruction that it recognizes as being able to handle. Note that in addition to the above-described benefits from extensions, this allows extending an existing instruction set handled by the TISA instruction decode component 127.

In general, an arbiter 250 is signaled by each instruction decode block 127, 140 and 144 that claims the recognized instruction as its own for processing. More particularly, because multiple decode blocks may recognize and decode the same instruction, an arbiter 250 is provided to determine which row has priority for handling a given instruction. This priority may change depending on which extensions are loaded, and thus the arbiter may be configured via the system coprocessor 122 with the currently desired priority. Note that this allows an extension to handle an instruction that otherwise would be handled by the TISA execution path, as well as to handle extended instructions not recognized by the fixed decode component 127. Further note that a loaded extension's instruction decode block may be deactivated by the arbiter such that its execution path is never taken, even if no other decode block recognizes an instruction, until that decode block is later reactivated. In the event no active decode block recognizes and instruction, a reserve instruction exception may be thrown (as with a conventional processor) which may be handled by software as appropriate.

An enable bit also may be provided on a decode block, such as to selectively enable and disable instruction decode blocks. For example, this bit may be controlled on each decode block depending on which program is sending the instruction, e.g., to activate a certain extension only for a certain application program. In this manner, extensions may be temporarily disabled by system software, e.g., using the supervisor-mode processor's control registers. If the opcode of an instruction is associated with an extension that is temporarily disabled, the instruction generates an illegal instruction exception, or it is treated as a no operation (NOP). System software defines which action is taken via the supervisor-mode processor's control registers. Note that another bit may used to control the decode block's behavior when disabled, e.g., the bit value determines whether to throw an illegal instruction exception or output a NOP instruction.

Returning to FIG. 2, in turn, the arbiter 250 signals a multiplexer 252 so that the correct execution block is used for the output of the control signals. Thus, as represented in FIG. 1, each instruction decode block 127, 140 and 144 handles the fetched instruction, however only one control signal gets to blocks 128, 141 or 145 for execution. The architecture thus avoids timing penalties by eagerly activating the instruction decode blocks 127, 140 and 144 in parallel, and using a multiplexer 252 (or set of multiplexers) to enable access to the memory 123 or register file 124 only to the correct execution block, e.g., the TISA execution component 128 or the execution block or blocks (141 and/or 142, or 145 and/or 146) of one extension.

In the event the TISA instruction decode wins the arbitration, the execute component 128 is active to handle the control signals, with the memory access component 129 and/or writeback component 120 used as appropriate, as in a typical processor pipeline. In the event an extension wins the arbitration, a NOP is sent to the execute block 128 for the TISA pipeline, with the necessary control signals sent from the winning reconfigurable instruction decode block (e.g., 140) to the corresponding reconfigurable execution block (e.g., 141). In this manner, the TISA execute component 128 does not output anything that would interfere with the memory access component 129 or writeback component 130.

If an extension wins, and its execution block (e.g., 141) only requires one clock cycle for handling the control signal, the execution block's output is sent to the inter pipeline traffic, or if memory access is required, to the memory access component 129. If two clock cycles are required and memory access is not required, (e.g., as represented in FIG. 1 by the dashed extended reconfigurable execution block "1+" labeled 142), the output from the reconfigurable execution block 142 reenters the pipeline at the writeback component 130. Thus, note that if an extension's instruction requires two cycles to complete but does not access memory 123, there is no stall in the overall execution pipeline. If more than two clock cycles to complete the execution of the block 141 and/or 142, but still less time than what it replaced, the next instruction in the processor is stalled until the execution block finishes and returns to the pipeline.

It is possible for an extension to execute for a plurality of cycles, by stalling the instruction fetch unit 126. During a multi-cycle execution it is therefore possible for the extension to access memory multiple times. Each access potentially could cause a translation look-aside buffer (TLB) miss; other exceptions (overflow, unaligned operands, and so forth) are also a possibility. Thus, when coding an extension, the state of the processor needs to be consistent in case of an exception, and software needs to be able to recover and continue execution (including transparently in the case of a TLB miss). One way is to use a virtual program counter that points into the software basic block that is realized by the extended instruction. Upon an exception, execution restarts from within the basic block as indicated by the virtual program counter. In this way, the extension does not have to deal with atomicity in the face of exceptions. The virtual program counter technique may be used to optimize a plurality of basic blocks that (conditionally) invoke each other. For example, this is the case for simple loops or loops containing if-then-else statements in a high level language, or simple procedural inlining.

Further advantages are achieved with respect to parallel execution and/or replication of extensions. More particularly, when multiple extensions are loaded and active, they can operate in parallel and in a pipelined fashion. In an ideal case, all blocks of all extensions would be active on separate stages of execution. A sophisticated instruction fetch unit may dispatch multiple instructions in parallel, one instruction per extension, and one in the trusted instruction set path. A simple instruction fetch unit may instead dispatch just one extended instruction per cycle. Note however that when activating multiple extensions in parallel, they may all potentially generate exceptions. A more sophisticated mechanism than the virtual program counter described above, such as those used in implementing speculate execution, may be used to handle such situations.

Figure 3:
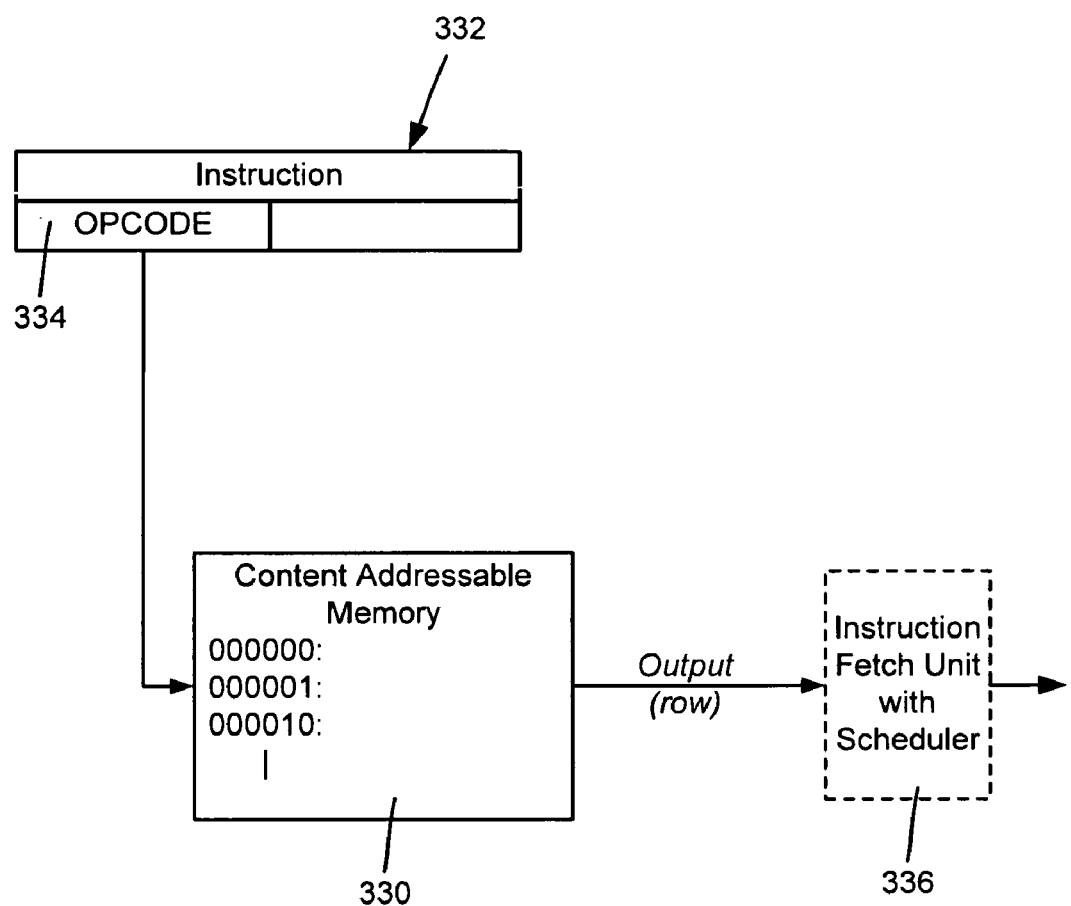
FIG. 3 is a block diagram generally representing an example of how a content addressable memory may be used to determine which execution path of a plurality of execution paths will handle an instruction.

In one example implementation represented in FIG. 3, a content addressable memory (CAM) 330 in the trusted portion may be used (e.g., as the arbiter) to dynamically associate opcodes to the TISA execution block 128 or to the reconfigured extension that implements them. In general, as the CAM 330 receives each instruction 332, the instruction's opcode 334 is fed to the CAM 330, which in turn outputs data that determines which execution path (e.g., the TISA row or which extension row) will handle that instruction. Note that for parallel operation, an instruction fetch unit with scheduler (shown as a dashed block 336 in FIG. 3) or the like may be used to route the output to a non-busy row.

It is possible to load multiple copies of the same extension to achieve a higher rate of instruction completion. Note that this case is handled specially by the instruction fetch unit, as the above-described architecture enables one of the multiple extensions, because they all use the same opcodes. To realize the desired parallelism, in the content addressable memory 330 of FIG. 3 the entry for the opcode(s) indicates a plurality of extensions rather than just one. This may be accomplished using extension identifiers that are a combination of the extension type and the extension slot it occupies. This output is then directed to an extra logic element that schedules the next available unit, or stalls if none is available.

With a CAM 330, it is the trusted instruction set architecture that controls and enables individual extensions. One advantage of this approach is that an extension does not have to explicitly recognize specific opcodes, but rather can be dynamically associated to each. This allows system software to better manage the (limited) space of opcodes devoted to the extensions. Application programs can be relocated to use a different opcode if necessary, at program loading time.

Moreover, extensions can be unloaded simply by removing the opcodes from the CAM. Physical space for the extension may be recovered when loading the next extension. Alternatively, an extension that does nothing (or performs a sometimes useful function such as a floating point unit) can be loaded to wipe-out an extension that is misbehaving, e.g., due to hardware faults, such as bit flips due to radiation or manufacturing defects.

The MIPS (microprocessor without interlocked pipeline stages) instruction set includes instructions to move data between the general-purpose register file and the coprocessor's register files. This is used in the floating point instruction set architecture. If the floating point unit is an extension, the realization of these instructions may become a problem; note that the trusted instruction set architecture also decodes them, because it implements coprocessor zero (0) for the main memory unit and other privileged processor state. Only if the named coprocessor is not zero will the extensions take over. The general mechanism of using the CAM will not work because multiple extensions will want to recognize these opcodes. Thus, a similar solution is applied, namely, the entries for these opcodes specify a plurality of extensions, and only the one named in the coprocessor number field of instruction 332 is enabled by the additional logic element.

Note that if and when security is not a concern, the trusted instruction set architecture may be further reduced, providing essentially only the means for self-extension. For instance, the MMU (alternatively referred to as TLB) may be realized as an extension and some instructions might not be implemented, such as division and multiplication. It is also possible for an extension to replace some or all of the opcodes realized by the trusted instruction set architecture; in this case the trusted instruction set architecture's instruction decode block is realized with a CAM, and the trusted instruction set architecture itself is thought of as an extension, e.g., the first one. Opcodes move to a different extension by changing the entries in the CAM. An even simpler approach is to change the priority of instruction recognition, namely, if extensions take precedence over the trusted instruction set architecture, they can selectively take the opcodes away from the trusted instruction set architecture by inserting and removing entries in the CAM 330.

Figure 4A:
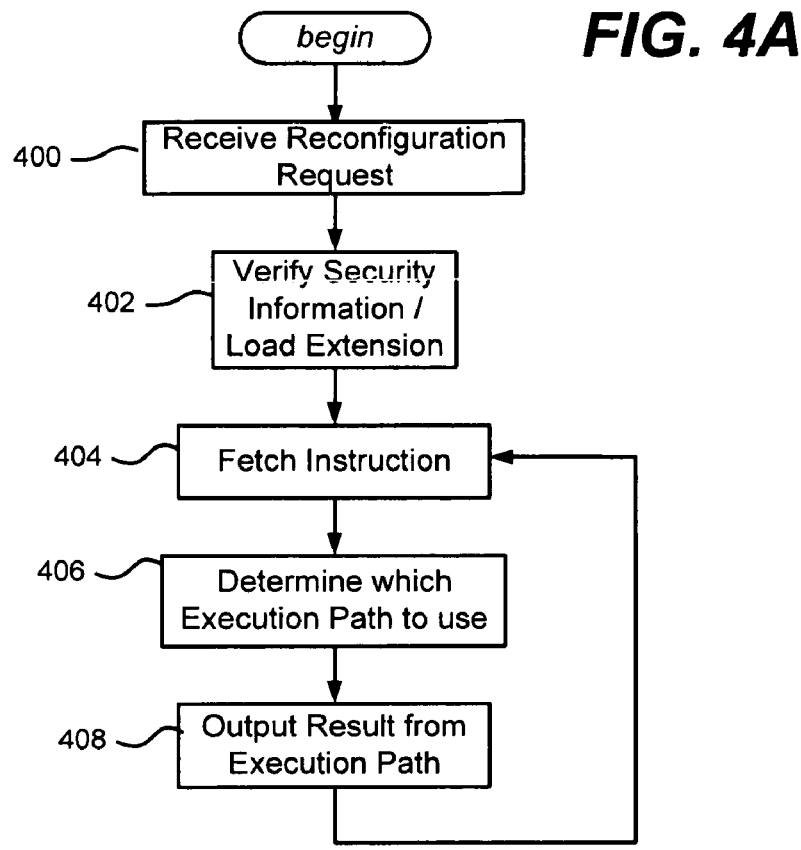
FIG. 4A is a flow diagram generally representing handling of instructions by one of a plurality of execution paths, including an execution path corresponding to a dynamically loaded extension.
Figure 4B:
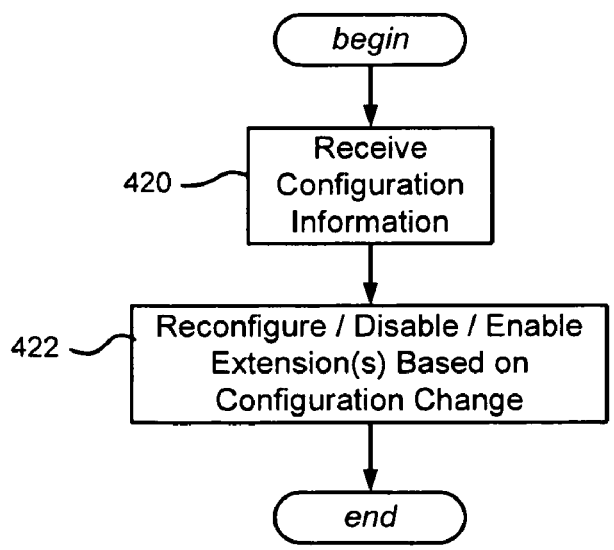
FIG. 4B is a flow diagram generally representing example steps that may be taken in response to a change in configuration information of the reconfigurable microprocessor.

FIGS. 4A and 4B summarize the general operations in a typical example flow diagram, beginning at step 400 which represents receiving a request to reconfigure the microprocessor 120 in some way, e.g., by loading a specified extension. Step 402 represents verifying the extension's associated security information and, if appropriate, loading the extension to reconfigure the microprocessor 120. Note that this assumes security verification is necessary in this particular architecture.

Step 404 represents fetching the instruction, while step 406 represents determining which execution path to use to handle that instruction. As described above, this determination may be made via a CAM-based mechanism, e.g., by data output from the opcode that corresponds to an execution path row to use, by a priority-based mechanism (e.g., an arbiter and multiplexer) that resolves conflicts if multiple instruction decode blocks recognize and claim the same instruction, or by any other differentiation means, such as a scheduler that handles parallel instruction handling. Step 408 represents outputting the result from the selected execution path.

FIG. 4B represents the concept of dynamically reconfiguring a microprocessor 120 when configuration information is received at step 420. Step 420 may be based upon any need for a configuration change, such as new application being executed that runs more optimally with a certain extension, a power management mechanism that disables and enables execution paths based upon power consumption and/or need for more or less processing power, a change in a peripheral's operating state (as described below), and so forth. Step 422 represents disabling and enabling the appropriate extension or extensions. Step 422 represents any way to perform such an action, such as by activating port 178, changing the contents of a CAM, changing the priority and other data in another type of arbiter, toggling an enable/disable bit, and so forth.

In this manner, extensions may be provided that better optimize an application program's execution. However, it should be noted that an extension is not limited to processing computational instructions, but rather can comprise any logic element, of any size. For instance, an extension may implement a watchdog timer, it may monitor and verify assertions related to the operating software (such as with model checking), it may collect performance data for subsequent software optimization, it may provide redundant execution units for fault-tolerant computations, and/or may perform security monitoring.

Further, an extension may implement a hardware peripheral, such as a USB controller. Note that operational codes (opcodes) may not be needed for these types of extensions because they may be accessible over the internal memory bus as regular peripherals. However, if used, opcodes may provide an interface to the peripheral that differs from the usual memory read/write operations. An opcode may, for instance, refer to a number of registers in the register file instead of just the one register used by the regular load/store operations as source or destination of the transfer. Special opcodes may also be useful to address atomicity constraints, e.g., situations in which multiple transfers between the processor and the peripheral are required to occur in a transactional, all-or-nothing fashion. Interrupts do not need to be disabled to provide the desired level of atomicity.

One reason for loading peripherals on demand is to optimize the use of the chip's area. It is generally a difficult task to select which peripherals to include in a microcomputer because different customers have different requirements. Further, much like the definition of an instruction set, what is considered the "optimal" peripheral selection changes over time, typically at an even faster pace than an instruction set. In a reconfigurable CPU 120, this choice can be made at power up time, or even later during execution. In general, only logic for those peripherals that will be used are loaded, avoiding any waste of chip area that would be unused while still consuming energy. If the application profile changes over time, it is then possible to reuse the area of a peripheral that will be unused for a long time and devote that chip area to different uses.

By way of an example, consider the case of a microcomputer that is used to collect, process and transfer data to some other computer. Data collection is performed using one peripheral, and data transfer using another. Data processing is expedited using application-specific instructions. Because the three phases do not overlap, the architecture makes use of the same area, to dynamically load each of the three different extensions that is required during each phase. The total required chip area comprises only the sum of the trusted instruction set architecture area plus the largest of the three extensions (in contrast to adding separate areas for all three extensions). Therefore the overall size of the chip decreases as does the overall energy usage.

When the chip area devoted to the extensions is abundant, the reconfigurable CPU may realize a more complex multiprocessing system, e.g., by allowing extensions to include additional complete data paths similar to the trusted instruction set architecture in functionality, or some other custom design. These additional data paths can be loaded on-demand to increase overall throughput by converting the RCPU into a multi-core system when the system is under heavy computational demand. When the system is lightly loaded the extensions may be disabled to save energy.

Figure 5:
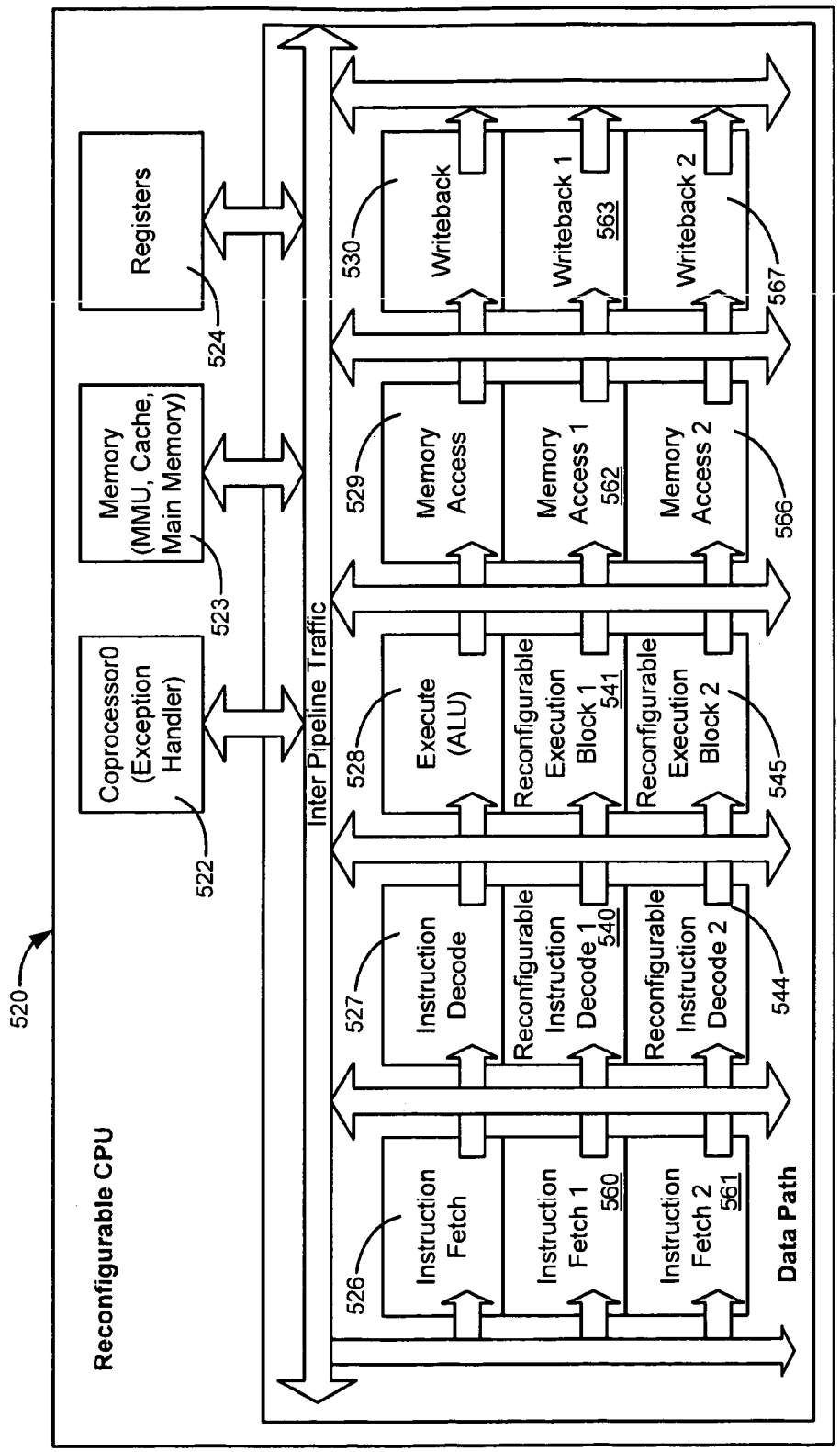
FIG. 5 is an illustrative example block diagram of a microprocessor architecture including a dynamically reconfigurable central processing unit configured to operate as a multiple core processor.

FIG. 5 represents an RCPU 520 converted into a multi-core processor, with each extension handling all five exemplified stages. Many of the components of FIG. 5 are similar to those of FIG. 1, and are numbered with the same label except having a "5xx" instead of a "1xx" label. For simplicity, these components are not described again. Note however that a difference between FIG. 5 and FIG. 1 is that each extension's execution path is a fully configured processor with its own instruction fetch unit (560 or 561), decode memory access block (562 or 566) and writeback block (563 or 567). Note that some resources may have to be duplicated inside the extension paths, such as 522, 524 and parts of 523 (e.g. the TLB is per-processor and the cache might or might not be shared), but this is not shown in FIG. 5 for simplicity. Each processor need not handle the same instruction set; for instance one processor might be devoted to execution of "legacy" software. If all processors implement the same instruction set, this provides parallel execution as in contemporary shared memory multiprocessors. As described above, to reduce power consumption, any processor may be disabled on demand, such as when significant processing power is not needed, and re-enabled as more processing power is needed.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A microprocessor architecture, comprising:
    a trusted instruction set execution path;
    a secure loader that evaluates security information associated with an extension to a microprocessor base instruction set as part of a loading process, the secure loader configures a reconfigurable execution path based on the security and management information, if the security information is evaluated as safe, the reconfigurable execution path corresponding to the extension, if the security information evaluated as safe by the secure loader;
    a mechanism that determines when a fetched instruction is to be handled by the reconfigurable execution path or the trusted instruction set execution path; and
    means for dynamically disabling the reconfigurable execution path corresponding to the extension based upon a configuration change.

2. The microprocessor architecture of claim 1 wherein the configuration change is based on power consumption.

3. The microprocessor architecture of claim 1 wherein the configuration change is based on processing power.

4. The microprocessor architecture of claim 1 wherein the configuration change is based on processing power.

5. The microprocessor architecture of claim 1 wherein the configuration change is based on a need for handling a certain instruction set.

6. The microprocessor architecture of claim 1 wherein the configuration change is based on a changed computing task.

7. The microprocessor architecture of claim 1 wherein the configuration change is based on parallel instruction handling.

8. The microprocessor architecture of claim 1 wherein the configuration change is based on a changed peripheral configuration.

9. The microprocessor architecture of claim 1 wherein the configuration change is based on an application program that is executable in the system.

10. A method comprising:
    verifying security information associated with an extension to a microprocessor base instruction set;
    if the security information associated with the extension is verified as safe:
        loading the extension to reconfigure a microprocessor with a reconfigured execution path, such that the microprocessor includes a plurality of execution paths including the reconfigured execution path;
        fetching an instruction for execution; and
        determining from the instruction which of the plurality of execution paths to use to execute the instruction; and
    dynamically disabling the reconfigured execution path corresponding to the extension to reconfigure the microprocessor based upon a configuration change.

11. The method of claim 10 wherein the configuration change is based on power consumption.

12. The method of claim 10 wherein the configuration change is based on processing power.

13. The method of claim 10 wherein the configuration change is based on processing power.

14. The method of claim 10 wherein the configuration change is based on a need for handling a certain instruction set.

15. The method of claim 10 wherein the configuration change is based on a changed computing task.

16. The method of claim 10 wherein the configuration change is based on parallel instruction handling.

17. The method of claim 10 wherein the configuration change is based on a changed peripheral configuration.

18. The method of claim 10 wherein the configuration change is based on an application program that is executable in the system.

19. A system in a computing device, the system comprising:
    a memory;
    a register set comprising at least one register, and
    a reconfigurable central processing unit coupled to the memory and register set, the reconfigurable central processing unit comprising:
        an instruction fetch block that fetches an instruction;
        means for decoding the instruction into at least one control signal;
        a plurality of execution blocks that execute the instruction corresponding to the control signal or signals, including at least one execution block that is dynamically configurable;
        a secure loader that evaluates security information associated with an extension to a microprocessor base instruction set as part of a reconfiguration process, the secure loader configures the execution block that is dynamically configurable, if the security information is evaluated as safe; and,
        means for dynamically disabling the dynamically configurable execution block based upon a configuration change.

20. The system of claim 19 wherein the configuration change is based on power consumption, processing power, a need for handling a certain instruction set, a changed computing task, parallel instruction handling, a changed peripheral configuration, or an application program that is executable in the system.

* * * * *